UNITED STATES PATENT OFFICE.

HANS WOLF, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PROCESS OF PRODUCING OXIDS OF NITROGEN.

1,094,182.　　　　Specification of Letters Patent.　　Patented Apr. 21, 1914.

No Drawing.　　Application filed December 4, 1913.　Serial No. 804,729.

*To all whom it may concern:*

Be it known that I, HANS WOLF, citizen of the German Empire, residing at Ludwigshafen-on-the-Rhine, Germany, have invented new and useful Improvements in the Process of Producing Oxids of Nitrogen, of which the following is a specification.

It has long been known that ammonia can be oxidized by means of oxygen or air in the presence of a catalytic agent, giving rise to oxids of nitrogen, but that in those cases in which a metal of the platinum group is employed as the catalytic agent this very often gradually loses its activity.

I have found that this loss of activity is due to the deposition of dust on the catalytic agent which is the case even when the gases employed are at some prior stage of the process completely freed from dust. I have also found that the explanation of this anomaly lies apparently in the fact that iron and copper and other materials which are used in the construction of the apparatus give up to the gas dust-like impurities and the aforesaid objection can be overcome by subjecting the gas before it reaches the catalytic agent to careful purification from impurities and especially from dust, and further by preventing the purified gases from coming into contact with iron or copper, or other material of the apparatus which yields dust-like impurities to the gases, before they reach the catalytic agent. As a result of what is herein stated, I have now found that I can obtain a good continuous yield of oxids of nitrogen by the oxidation of ammonia by means of oxygen, under which term I also include gases containing oxygen, such for instance as air, in the presence of a catalytic agent by taking care that the gas, after it has been purified, is allowed only to come into contact with apparatus formed of nickel, alloys containing a high percentage of nickel, or other compounds which do not yield dust-like particles to the gas.

Now what I claim is:—

The process of producing oxids of nitrogen by oxidizing ammonia by means of oxygen in the presence of a catalytic agent while preventing the gases from carrying dust-like impurities to the said catalytic agent.

In testimony whereof I have hereunto set my hand in the presence of two subscribing witnesses.

HANS WOLF.

Witnesses:
　ERNEST F. EHRHARDT,
　S. S. BERGER.